(No Model.)  6 Sheets—Sheet 1.
F. O. BLACKWELL.
ELECTRIC MOTOR REGULATION.
No. 468,128. Patented Feb. 2, 1892.
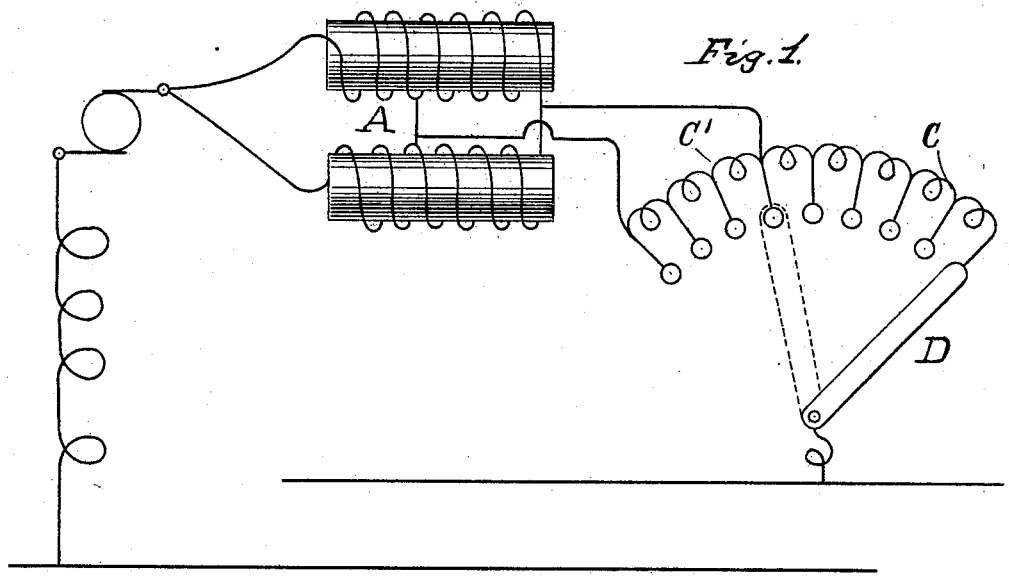
*Fig. 1.*
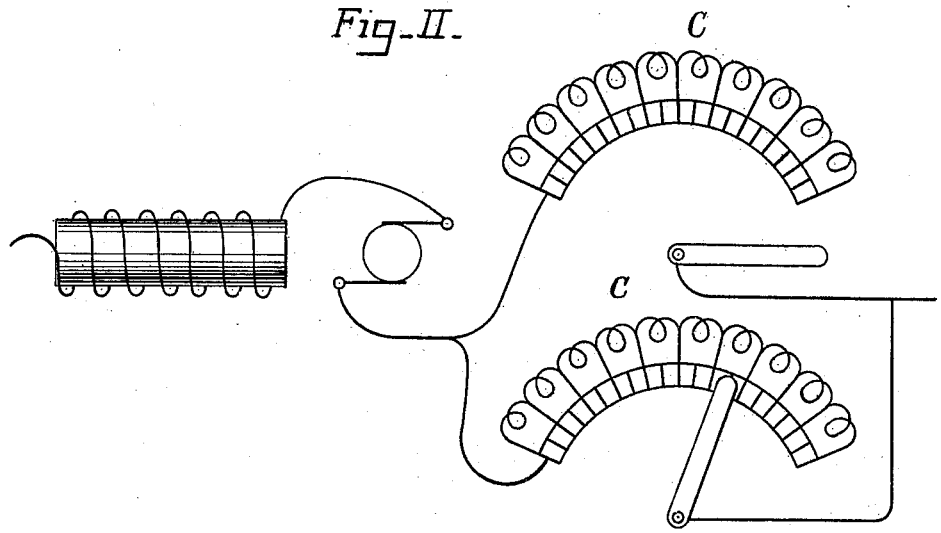
*Fig. II.*
Witnesses
Julien M. Elliot
S. M. Cauldwell
Inventor
Francis O. Blackwell
by Bentley & Knight
Attys.

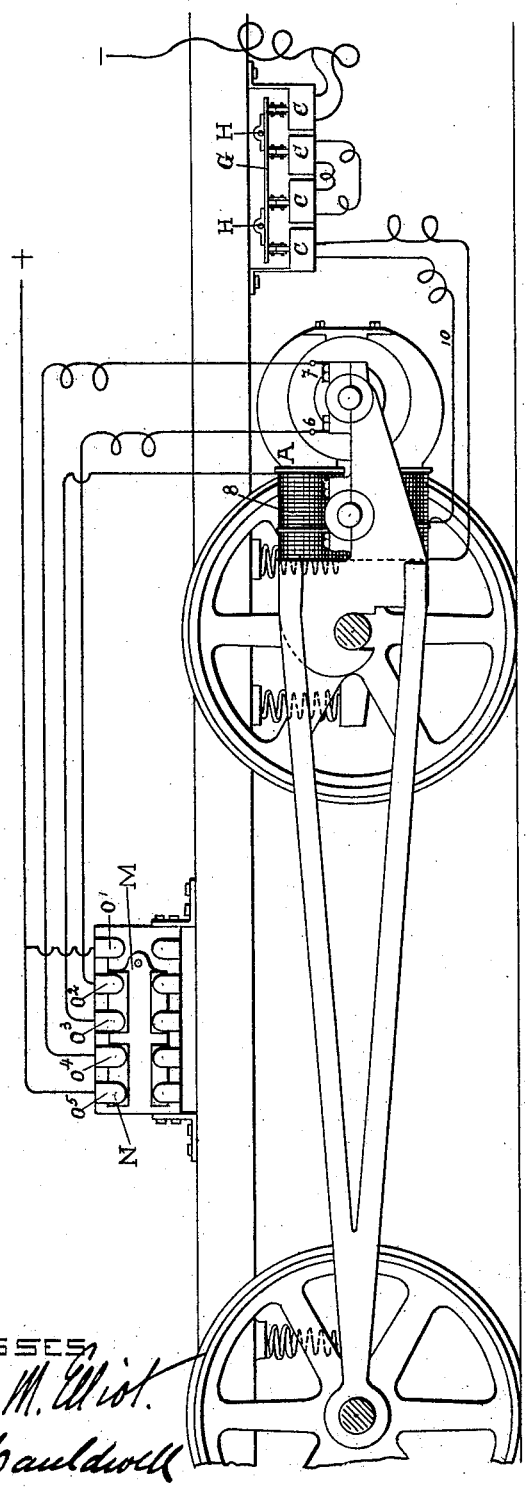

(No Model.) 6 Sheets—Sheet 3.
F. O. BLACKWELL.
ELECTRIC MOTOR REGULATION.
No. 468,128. Patented Feb. 2, 1892.
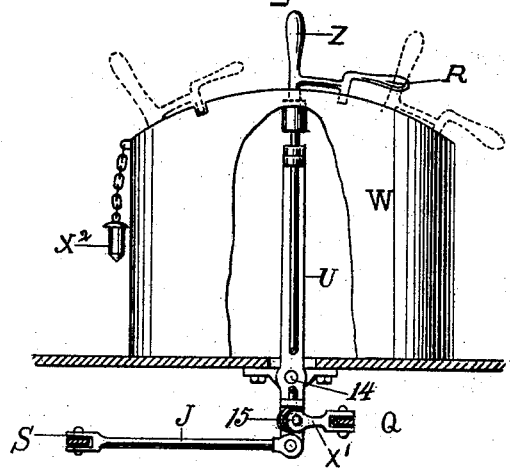
Fig IV
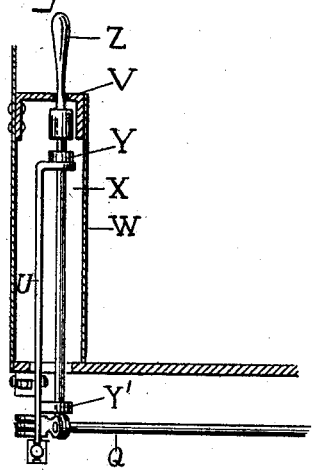
Fig V
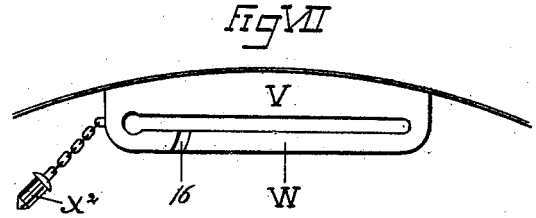
Fig VI
Fig VII
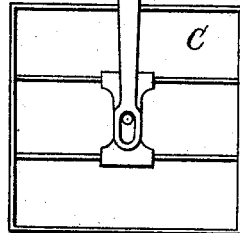
Witnesses
Julien M. Elliot
S. M. Cauldwell
Inventor
Francis O. Blackwell
by Bentley & Knight
Attys.
THE NORRIS PETERS CO., PHOTO-LITHO., WASHINGTON, D. C.

(No Model.) 6 Sheets—Sheet 4.
F. O. BLACKWELL.
ELECTRIC MOTOR REGULATION.
No. 468,128. Patented Feb. 2, 1892.
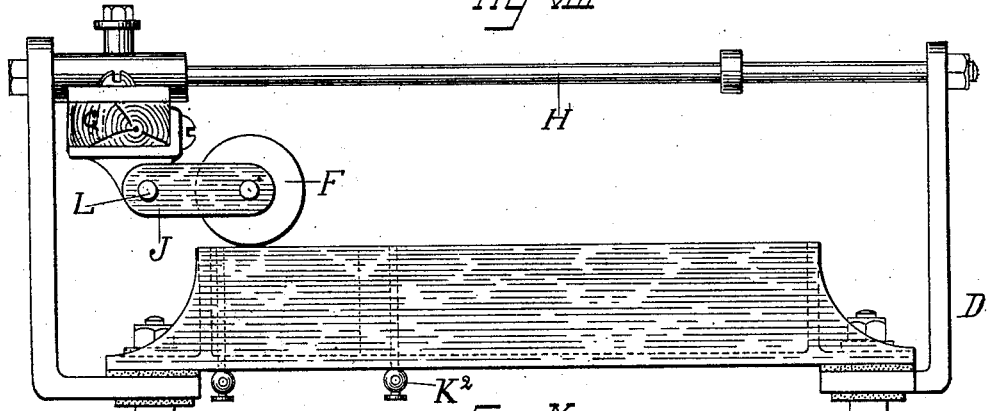
Fig VIII
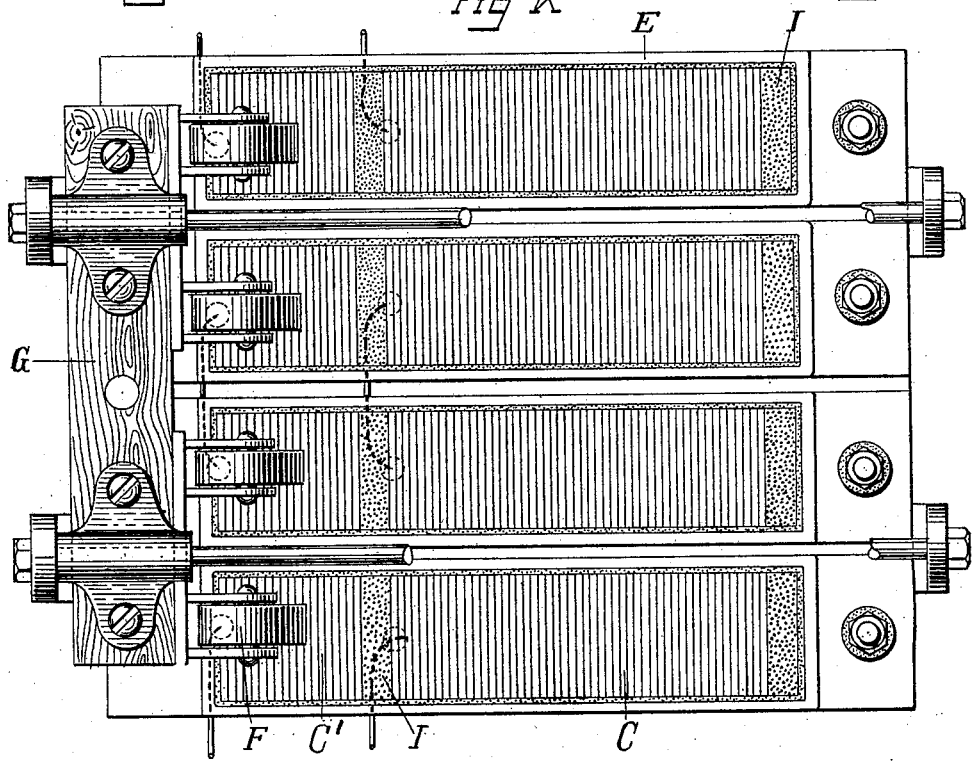
Fig IX
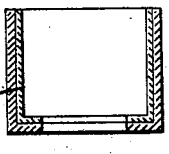
Fig X
Witnesses
Julius M. Elliot
S. M. Cauldwell
Inventor
Francis O. Blackwell
by Butley & Knight
Attys.

(No Model.)  6 Sheets—Sheet 5.
F. O. BLACKWELL.
ELECTRIC MOTOR REGULATION.
No. 468,128. Patented Feb. 2, 1892.
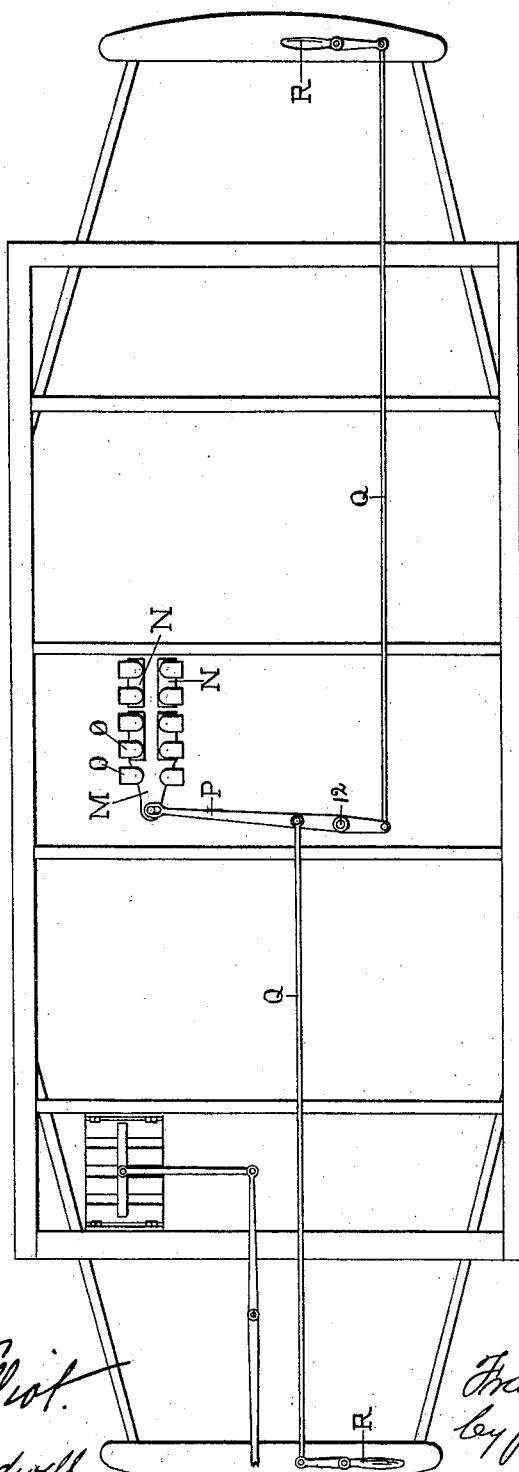
Fig. XI.
Witnesses
Julien M. Elliot.
S. M. Cauldwell
Inventor
Francis O. Blackwell
by Bentley & Knight
Attys (No Model.) 6 Sheets—Sheet 6.
F. O. BLACKWELL.
ELECTRIC MOTOR REGULATION.
No. 468,128. Patented Feb. 2, 1892.
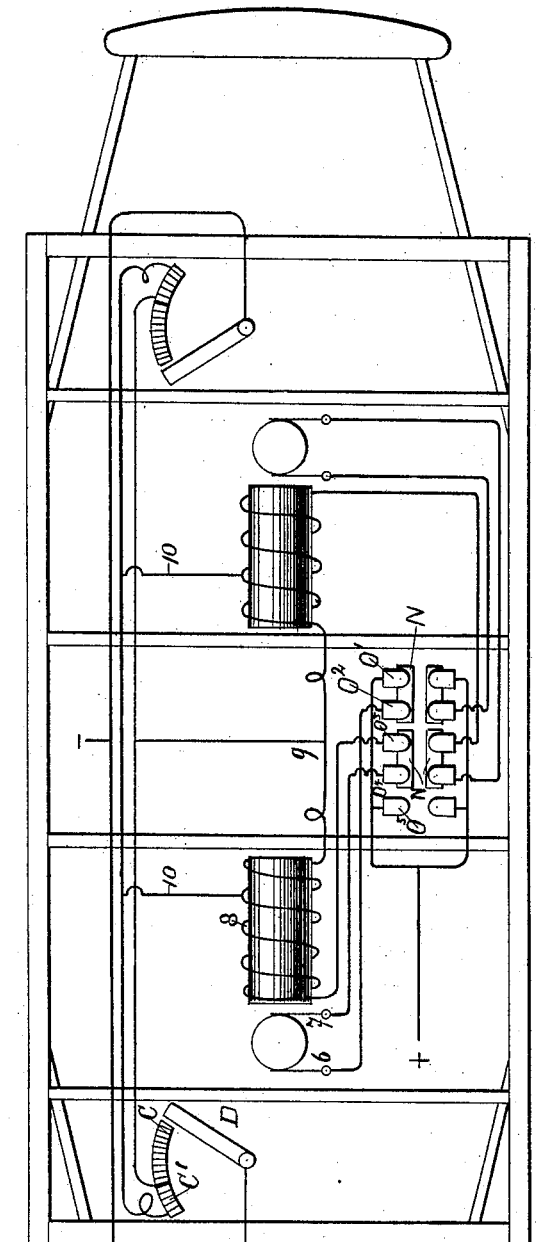
Fig. XII.
Witnesses
Julien M. Elliot.
S. McCauldwell
Inventor
Francis O. Blackwell
by Bentley & Knight
Attys

UNITED STATES PATENT OFFICE.

FRANCIS O. BLACKWELL, OF NEW YORK, N. Y., ASSIGNOR TO THE THOMSON-HOUSTON ELECTRIC COMPANY, OF CONNECTICUT.

ELECTRIC-MOTOR REGULATION.

SPECIFICATION forming part of Letters Patent No. 468,128, dated February 2, 1892.

Application filed June 5, 1889. Serial No. 313,180. (No model.)

*To all whom it may concern:*

Be it known that I, FRANCIS O. BLACKWELL, a citizen of the United States, residing at New York, in the county of New York, State of New York, have invented certain new and useful Improvements in Electric-Motor Regulation, of which the following is a specification.

My invention relates to electric motors, especially those employed in electric railways; and it consists in certain devices for controlling a car provided with one or more motors. It is illustrated in the accompanying drawings, in which—

Figures I and II are diagrams of the motor connections. Fig. III shows the reversing-switch arranged with relation to the car. Figs. IV, V, VI, and VII illustrate details of the operating-lever. Figs. VIII, IX, and X illustrate details of the resistance-box. Figs. XI and XII show, diagrammatically, the relation of motors, resistances, and reversing devices on the car.

It has been found desirable in the practical operation of motors for railway purposes to control them both by inserting resistance and by cutting out a part of the field-magnet coils. It has been found, however, that in cutting out the field-magnet coils an extra current is induced by the sudden change, which tends to injure the insulation. I have therefore provided a rheostat which shall be inserted in the main line and a secondary rheostat through which the field-magnet coils may be gradually cut out. This is illustrated in Fig. I, in which A represents a motor having its two field-magnets in series with its armature and in multiple arc with each other. C is a rheostat adapted to be inserted in series with the motor by means of the switch D. In the position shown all of resistance C is included in the circuit; but as the switch D is moved to the left resistance is gradually cut out until when it reaches the position of the dotted lines there is no resistance whatever in the circuit. A further movement of switch D cuts out a part of the field-magnets through the secondary resistance C', which is, as shown, connected in circuit between the terminals of different sections of the field. This cutting out of the field-magnets is effected gradually through C', and the extra current, tending to injure the insulation of the motor, is thereby avoided, the resistance being cut in when the switch is first thrown and then cut out again when the movement is completed.

In Fig. II, I have shown two resistances C C, both connected to one pole of the motor and adapted to be inserted alternately in the circuit, so that one may be used at a time for controlling the motor, the one not in use being allowed to cool in the meanwhile. By this means I am enabled to use a smaller resistance-box, since it is in active use but half of the time. One of these may be used for each direction of movement of the car. The double resistance is also used as a precaution against the laying up of the car, for should one become accidentally out of order the other may always be used.

In practice for carrying out my invention I prefer to make use of a resistance composed of iron plates set in a box and provided with a contact-roller adapted to pass over the edges of the plates. This is illustrated in Figs. VIII, IX, and X. The plates are held in a series of boxes E, each box being complete in itself, and insulated from the supporting-frame D. These plates are insulated from their box by means of fire-proof insulation, such as mica or asbestus. A number of boxes E are placed side by side and a series of contact-rollers are adapted to travel over them. These contact-rollers F are fastened in pairs to a piece of insulating material G, which is adapted to move over the boxes on guides H. The circuit will then be completed from one box to the next by means of rollers F, connected electrically in pairs, the connection between the two adjacent boxes being completed by a wire K. It will thus be seen that as the piece G, with the rollers attached, moves over the boxes of plates more or less of the plates will be brought into series and the resistance of the circuit will be thereby controlled. At one point in the series of resistance-boxes blocks of insulating material I will be inserted. These blocks will be similar to the end blocks I I, which are made of slate or similar non-combustible material and serve as the terminal of the plate series, so that the circuit may be interrupted upon them without damage.

As will be seen in Fig. X, the box E is open completely at its upper surface to permit the rollers to pass over the edges of the plates, and has a similar but narrower opening on the bottom. This allows a circulation of air without interruption from the contact device, while at the same time it affords a corner or ledge for holding the plates. Contact with the plates is preferably made from the bottom, as is seen in Fig. VIII, where the binding-posts $K^2$ are attached to certain plates of the series and extend outward through the opening in the bottom of box E. The contact device in this case does not interfere with the flexible connections which lead from the binding-posts to the motors upon the truck and other parts of the vehicle. This box, as will be seen in Fig. III and also in Figs. XI and V, is supported from the car-body, which is of insulating material, and at the same time is less liable to shocks and injury from mud and water. Since the boxes E are each insulated from the frame D and the frame D again insulated by the car-body, substantially complete protection to the driver and to the apparatus from leakage is secured. I preferably suspend the resistance-boxes beneath the car-body, as sufficient ventilation is thereby afforded, while it is in a more convenient position both for connection with the motor on the truck and with the actuating devices at each end of the vehicle.

The main resistance described in Fig. I as resistance C will correspond to the larger part of each box of plates. The resistance C' will be represented by the smaller part of the plates and the lever D will be represented by the contact-rollers upon piece G. The circuit connections will be as they are indicated in Fig. I, so that the rollers will first cut out the whole of the main resistance, and then by their further movement will cut out a part of the field-magnet coils through resistance C'. Preferably more than one roller F will be used for making contact, and it will be seen from Fig. VIII that the roller F is journaled on the end of a short pivoted arm J, held down into contact with the surface of the plates by a spring L. The arm J is attached to the under side of piece G. By this arrangement there is no tendency of the guide G to bind by reason of the pressure of the springs downward upon the surface of the plates in whichever direction it may be moving. In practice two of these resistance-boxes would be placed on a car, one at each end, as shown in Fig. XII. Each of these would be controlled by means of the apparatus shown in Figs. IV, V, VI, and VII, which will be hereinafter described.

For reversing the motor I provide a switch which, mechanically considered, is a single switch, but electrically a double or separate switch, enabling each motor to be independently reversed. In speaking of it as a "switch" hereinafter I have in mind the mechanical standpoint and do not mean to imply a single switch reversing both motors by a single change of circuit connections. The motors will thus be free to correspond to their individual load, which would not be the case were a common reversing-switch used for the two. The reversing-switch, as shown in Figs. XI and XII, consists of an insulating-plate M, provided with four contact-pieces N, engaging with stationary contact-pieces O O', &c.

By reference to Fig. XII the circuits for the two motors, the reversing-switch, the resistance-box, and the field cut-out will be clearly understood. The current entering at the point marked "plus" divides, each branch going first through a reverse switch, which changes the direction of current in the armature, then through the armature and through the field, where it meets a corresponding branch through the reverse-switch, armature, and field of the other motor. The two branches united then pass through one or the other of the resistance-boxes to the outgoing connection marked "minus." This circuit through one of the motors will be traced in detail, (taking, for example, the left-hand motor of Fig. XII.) Entering at plus, the current goes to contact-point O', and thence by plate N to contact $O^2$. It then goes to the armature through brush 6, leaving it at brush 7. It then returns to $O^4$, then by second plate N to $O^3$, and thence to field 8 to meet the other corresponding branch at 9. From 9 (supposing the left-hand resistance to be in use) it goes to resistance C to lever D, and thence out at the point minus. As the lever D is moved, it gradually cuts out C from circuit until it reaches the resistance C'. The current will then pass through only the first part of the field-magnet coils 8, and thence will go by the wire 10 to resistance C', to lever D, and a further movement of lever D throws out C' entirely, leaving only the motor, with a part of its field-magnet, in circuit. When the reversing-switch is thrown, the plates N are moved to the left, so as to connect contact $O^4$ with $O^5$ and $O^3$ with $O^2$. This will reverse the direction of current in the armature, the point O' being cut out of circuit entirely and the current passing from $O^5$ to $O^4$, thence to commutator-brush 7, through the armature to commutator-brush 6, to contact-point $O^2$, to contact-point $O^3$, and thence to the field-magnet, as before described.

The connection for the right-hand motor is the exact duplicate of that described for the left-hand motor.

As shown in Fig. XI, the reversing-switch is worked by a system of levers extending to each end of the car, and, as shown in Fig. III, the switch is situated on the car-body, so as to be actuated therefrom and protected from the weather, while flexible connections lead therefrom to the motor or motors on the truck. In actuating the switch it will be seen that it moves in a straight line instead of in the arc of a circle, as has heretofore been the case. The plate M is connected to one end of the lever P, which has at that end a slotted hole receiving a pin projecting from M. The lever P is pivoted at the point 12 and at equal distances from its center. Connecting-rods Q extend to opposite ends of the car, where they have oppositely-projecting handles R. It will thus be seen that the handles R for the motor-man are reversely connected with the switch—that is, they are connected so that a like movement of the handle at each end of the car will result in the same movement of the switch. The motor-man therefore throws the handle in a constant direction to effect a given control of the motors, thus reducing to a minimum the liability of mistakes on the part of careless operators. The resistance-boxes are placed one on each end of the car, and are actuated, preferably, by means of laterally-moving levers extending directly to the car-platform.

In practice I employ a single lever for operating both the resistance and the reverse and provide a stop, by which it is impossible to actuate the reverse unless the resistance is included in the circuit. In Fig. VI S represents a lever pivoted at 13 and moving horizontally and laterally to operate resistance C. The upper end of the lever extends out substantially flush with the front platform of the car and there has a connecting-rod J, connecting it to the lower end of an upright laterally-moving lever U. This lever U is pivoted at the point 14 and has a handle at its upper end passing through a slot in the top V of a box W on the platform. The lever U at its upper end has a ring Y embracing the rod X, and a similar ring Y' at its lower end, also embracing the rod X. The rod X is free to turn about its own axis in the bearings Y and Y'. At its upper end it has fitted over it a handle Z, which has a handle R integral with it, but extending out therefrom at right angles. On the lower end of the rod X is a short lever X', so pivoted to X at the point 15 as to have a free vertical movement and pivoted at its outer end to the rod Q, described in Fig. XI. It will thus be clear that the lateral movement of the handle Z will operate resistance C without affecting the reversing-switch, but that the handle R may be used to turn the rod X about a longitudinal axis, and thereby actuate the reversing-switch without interference with the resistance. In order that the reverse-switch may only be actuated at the time when all of the resistance is in circuit, there is a small lug on handle R, which projects down into the slot in V and prevents any movement of the handle R, except when this lug is opposite a groove 16 in the top V. This groove is so placed as to bring the lug on R opposite to it when all the resistance is in circuit. The handle R can then be operated, the lug passing through the groove 16. This position is illustrated by the dotted lines on the left hand of Fig. IV. By reference to Fig. VII it will be seen that the slot in V is enlarged at one end, so as to take in the shoulder on the lower end of handle Z when the handle Z is inserted, so as to engage the upper end of rod X. It can only be removed when the lever is in its extreme position with the resistance in circuit. It will also be noticed that the resistance-box is placed upon the car-body with the switch and is connected by flexible wires with the motor on the truck, and also that a single resistance-box is employed for both motors. As will be seen in Figs. IV and VII, a plug $X^2$, corresponding in shape to the lower part of the handle Z, is provided, which, when the handle Z is removed, may be inserted in place thereof through the enlargement of the slot in V. $X^2$ fits over the end of X in the same manner as the handle Z, and thereby prevents any movement thereof when the handle is removed.

The improvements in the resistance-box and resistance itself, which are herein described, and illustrated in Figs. VIII, IX, and X, I do not claim in this application, but in a kindred application which deals with these specific features only, filed January 12, 1891, Serial No. 377,539.

I claim—

1. In an electric motor, the combination of a sectional field-magnet coil, a switch cutting said sections into or out of circuit, and a resistance connected in circuit between the terminals of said coil-sections and cut in upon shifting the switch, as set forth.

2. In an electric motor, the combination of a sectional field-magnet coil with a switch and a resistance cut into circuit temporarily when the field-sections are varied by the switch and out again when the movement of the switch and change of field are completed, as set forth.

3. The combination, with an electric motor, of a regulating-resistance in circuit therewith, a sectional field-magnet coil, a cut-out therefor, and a secondary resistance connected in circuit between different coil-sections, and a common actuating device for both resistances.

4. The combination, in an electric motor, of a regulating-resistance in series therewith, a sectional field-magnet coil, and a secondary resistance coupled up between different sections of said coil, with an actuating device common to both resistances and acting upon them successively.

5. The combination, with an electric motor having sectional field-magnets in series with the armature and in multiple arc with each other, of a cut-out switch for the sectional coil, with an intermediate variable resistance between different sections of the coil, whereby the cutting out of the coil may be gradually effected.

6. The combination, with an electric motor A, of a regulating-resistance C in series therewith, a supplementary resistance C', connected to a section of the field-magnet coils, and a contact-arm D, passing over resistances C and C' in succession.

7. The combination, with an electric motor, of a controlling-resistance therefor, a reversing-switch reversing the direction of current flow through one of the members of the motor, and a common actuating-handle with separate connections, each adapted for different movements of the handle.

8. The combination, with an electric motor, of a speed-controlling device therefor, a reversing device, and a common actuating-handle for the two provided with connections to each corresponding to different movements of the handle.

9. The combination, with an electrically-propelled vehicle, of a controlling-resistance therefor and an actuating-lever for the resistance, moving about an axis longitudinal to the car, so that transverse movement of the handle relative to the car will actuate the resistance.

10. The combination, in an electrically-propelled vehicle, of a motor therefor, a regulating device for the motor, a reversing-switch, a transversely-moving lever for said regulator, and a handle for the reverse-switch connected to said lever and movable therewith.

11. The combination, in an electrically-propelled vehicle, of a controlling device therefor, a handle for said controlling device, and a reverse-switch for the motor, the said handle being located on the platform or other accessible part of the vehicle and provided with a stop in connection with the reversing mechanism, whereby the said device can only be actuated when the resistance-handle is in a predetermined position.

12. The combination, in an electrically-propelled vehicle, of two motors therefor and a common reversing-switch with connections therefrom extending separately through the armature to the field-magnet of the two motors, respectively, whereby each motor will be in series with its own armature.

FRANCIS O. BLACKWELL.

Witnesses:
EDWARD M. BENTLEY,
JAS. L. BLACKWELL.